B. DAY.
FILM FRAME APPARATUS.
APPLICATION FILED MAR. 2, 1909.
941,500.
Patented Nov. 30, 1909.
2 SHEETS—SHEET 1.
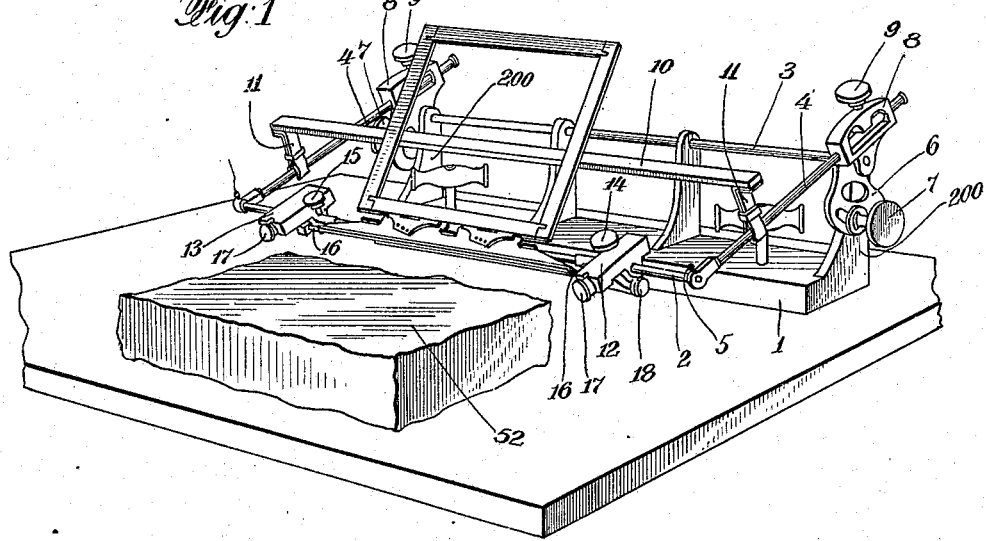
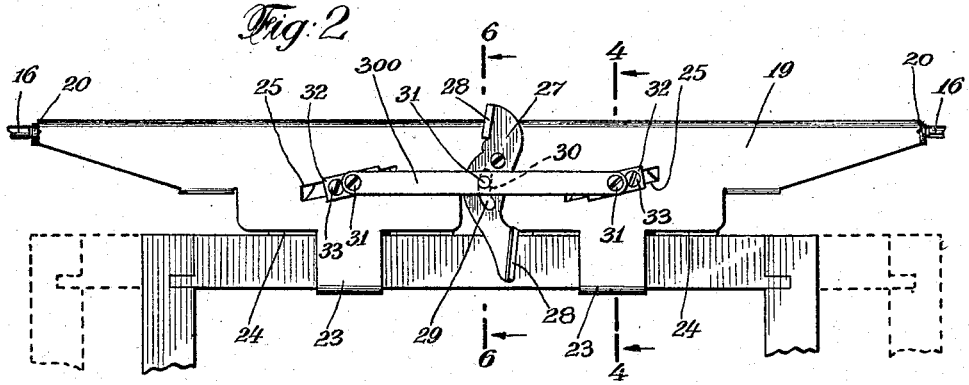
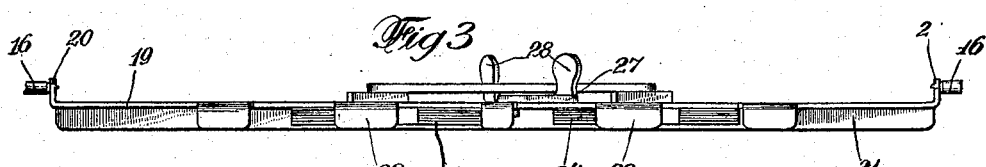
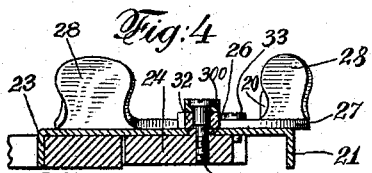
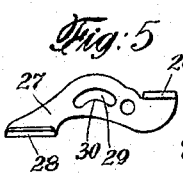

B. DAY.
FILM FRAME APPARATUS.
APPLICATION FILED MAR. 2, 1909.
941,500.
Patented Nov. 30, 1909.
2 SHEETS—SHEET 2.
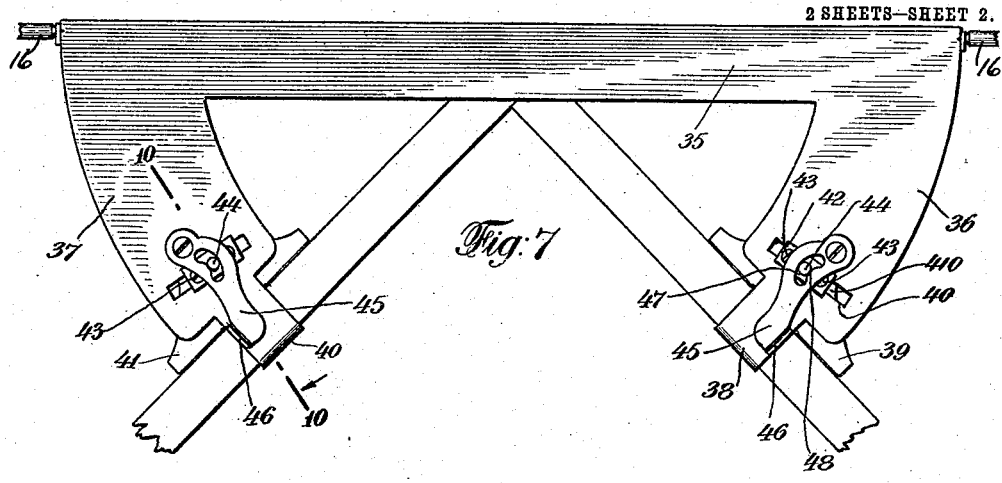
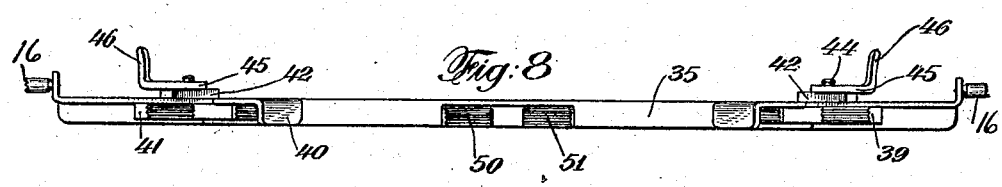
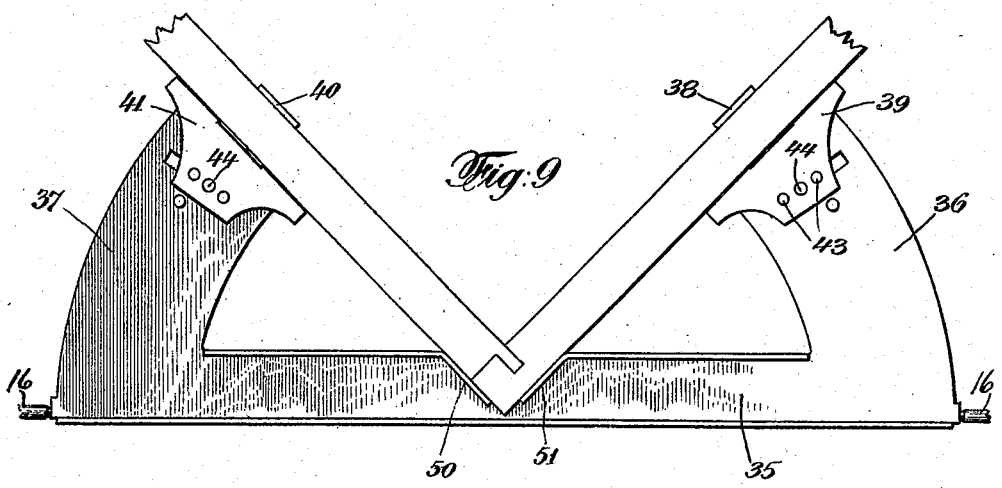
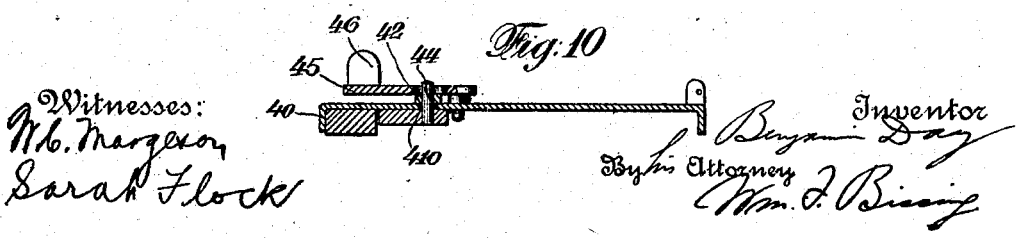

UNITED STATES PATENT OFFICE.

BENJAMIN DAY, OF SUMMIT, NEW JERSEY.

FILM-FRAME APPARATUS.

941,500.

Specification of Letters Patent.  Patented Nov. 30, 1909.

Application filed March 2, 1909.  Serial No. 480,964.

*To all whom it may concern:*

Be it known that I, BENJAMIN DAY, a citizen of the United States, residing at Summit, in the State of New Jersey, have invented a new and useful Improvement in Film-Frame Apparatus, of which the following is a specification.

My invention relates to a film frame apparatus, that is to an apparatus for utilizing printing films, which films have now come into wide use in connection with devices for shading drawings on stone, zinc and the like, and it relates more particularly to a bracket for securing film frames of different sizes in the apparatus.

One of the objects of my invention is to provide a bracket for film frames which will adjustably hold and secure film frames of different sizes, the bracket being so constructed and mounted in the apparatus which utilizes the film that the usual adjusting devices for the film are not altered and their operation not interfered with. This at the same time preserves the simplicity of structure of the present commercial form of apparatus and avoids the danger of altering the position of the delicate adjusting devices used to properly position and register the printing film with relation to the work on the stone or plate.

A more particular object of my invention is to provide an apparatus for utilizing printing films in which a cross-rod supports suitable carriages to which a bracket may be pivotally connected, the said bracket being provided with means for securing film frames of different sizes thereto.

Another object of my invention is to pivotally mount the bracket carrying the film frame directly in the carriages which are used to adjust the frame at the same time providing a bracket with jaws having an open throat for the insertion of the frame, the parts being so constructed and arranged that the bracket is adapted to carry film frames of different sizes without re-adjusting the carriages.

Another object of my invention is to provide the bracket which carries the film frames with a movable clamping jaw and an inclined way with which a member connected to the jaw coöperates, the member being readily actuated by a lever carrying a finger piece which lever is also provided with an arc-shaped track for positively and quickly opening and closing the jaw.

Another object of my invention is to provide a bracket carrying a plurality of pairs of jaws, each pair including a movable jaw actuated by a wedge, the movable jaws being connected by a link which is operated by a finger lever so that both jaws may be rapidly thrown into and out of clamping position, simultaneously.

With the above and other objects in view, my invention consists in the parts, improvements and combinations more fully pointed out hereinafter.

Referring now to the drawings, which are attached to the specification and form a part thereof: Figure 1 is a perspective view of the film frame-holder with the film frame thrown up so as to inspect the work. Fig. 2 is a view of one embodiment of the invention utilizing a substantially straight bracket. Fig. 3 is a front elevation of the bracket shown in Fig. 2, with the jaws open ready to receive the film frame. Fig. 4 is a detailed sectional view showing the lever with the finger pieces illustrated in Fig. 2 on the line 4, 4 looking to the left in said figure. Fig. 5 is a detail of the lever with the finger pieces for operating the movable jaw of the clamp. Fig. 6 is a detailed sectional view on the line 6—6 of Fig. 2 looking toward the left in said figure. Fig. 7 is a plan view of another embodiment of my invention in which the faces of the clamping jaws are arranged at right angles to each other so as to hold a film frame cornerwise. Fig. 8 is an elevation of the bracket shown in Fig. 7, with the jaws open. Fig. 9 is a bottom plan view of the bracket shown in Fig. 7, showing the stop carried by the bracket for the corner of the film frame. Fig. 10 is a detailed, sectional view on the line 10—10 in Fig. 7 looking in the direction of the arrow.

The particular form of the apparatus for utilizing printing films, to which my invention may be applied, may be widely varied. As illustrated in the drawings, the apparatus includes a portable base, such as the base 1 and a cross-rod 2 carried by the base. The means whereby the cross-rod is carried by the base may be widely varied. As illustrated, this result is accomplished by providing the base with suitable standards, such as indicated at 200 connected by the bracing rod 3. Two adjustable side rods 4 are preferably provided, to which the cross-rod 2 is secured, as by means of the set screws 5, said side rods being preferably mounted in sector wings 6. The clamp screws 7 hold the wings in the positions which they assume when the cross-rod 2 is raised and lowered to adjust the film to the surface of the stone. Boxes 8 are provided on top of the sector wings 6, through which boxes the side rods 4 slide. Clamp screws 9 are used to hold the side rods in their adjusted positions in the boxes. A film frame rest 10 may be supported from the side rods 4 by means of clamping legs 11 in the usual manner.

The carriages 12 and 13 which may be of the usual form are preferably adjustable lengthwise of the cross-rod 2, and in the structure illustrated are adjusted on the rod and secured in their respective positions by means of locking screws 14, 15. The carriages 12 and 13 may be revolubly adjusted on the bar 2 independently of each other so as to carry their pintles and the corresponding portions of the film frame toward and from the work. They are secured in position by the screws 14, 15. The carriages are also removable from their carrying rod 2. Each carriage is provided with a pivotal connector, which as illustrated, comprises the pintle 16. The usual threaded screws provided with protractor wheels 17 are mounted on the carriages. These afford a micrometric adjustment of the film frame toward and from the cross-rod 2. The pintle 16 on the carriage 12 is also provided with the usual screw thread and protractor wheel 18. By rotating the wheel 18, the pintle may be moved and the operator may thus adjust the printing film in a direction parallel to the cross-rod 2.

In accordance with my invention, I provide a bracket which is pivotally connected to each of the pivotal connectors on each carriage. The form of this bracket may be widely varied. As illustrated in Fig. 2, it comprises a plate 19 provided with means for pivotally securing the bracket to the carriages. I preferably provide ears 20 for this purpose, the said ears being preferably arranged at the ends of the plate. The bracket may also be provided with a strengthening rib 21.

Suitable means are provided carried by the bracket for securing film frames of different sizes thereto. It will be understood that it is particularly desirable to be able to insert film frames of different sizes, carrying different patterns or tints without altering the position of the carriages 12, 13 and without jarring or disturbing the adjustments of the apparatus. The means for accomplishing this result may be widely varied. In the particular embodiment of the invention illustrated, the bracket is provided with one or more pairs of jaws having an open throat as indicated at 22 for the insertion of a side of the film frame.

One jaw 23 of each pair is preferably fixed and the other 24 is made movable. The fixed jaw may be made integral with the bracket.

Suitable means are provided for moving and guiding the movable jaw. In the best embodiment of the invention, a wedge is used which may take the form of an inclined way 25, which coöperates with a member 26 secured to a part of the jaw. The way is inclined at an acute angle with relation to the gripping faces of the jaws 23, 24. Suitable means are provided for moving the member 26. In the best embodiment of the invention, I make use of a lever 27 for this purpose which is mounted on top of the plate of the bracket and suitably connects the lever with the member, the form of the connection being capable of wide variation. As illustrated, the lever 27 which carries one or more finger pieces 28 is provided with an arc-shaped track 29 carrying the projection 30. A pin 31 engages with the projection on the track. The pin is suitably connected with the member 26. As illustrated in Fig. 2, I make use of a connecting rod 300 for this purpose, the pin being carried by the rod and one end of the rod being pivotally connected to the member 26 by means of the screw 31. A cap plate 32 may be provided which is secured to the member 26 by the screws 33 so as to prevent the member from dropping out of the way 25. It will be observed by reference to Fig. 2, as indicated in dotted lines, that two film frames of different widths may be readily inserted between the jaws on the bracket, without disturbing the positions of the carriages carrying the pintles 16.

Referring now to the embodiment of the invention shown in Fig. 7, the bracket 35 is so constructed that it will take a film frame cornerwise. In the best embodiment of the invention, the bracket includes a plate which is provided with arms 36, 37, preferably rigidly secured to the bracket and in the best embodiment of this form of the invention, integral therewith. Each arm at its outer end is provided with suitable clamping jaws. One of these jaws 38 is fixed and preferably integral with the bracket and the other 39 is movable. The corresponding jaws carried by the arm 37 are lettered 40 and 41 respectively. Suitable means are provided for moving the movable jaws. In the embodiment of the invention illustrated in Fig. 7, the arm 36 is provided with an inclined way 40 inclined at an acute angle to the gripping face of jaw 39. A member 410 is secured to the jaw 39 and coöperates with the way 40. A cap plate 42 is secured by screws 43 to the member so as to prevent the member 41 from dropping out of the way 40. Suitable means are provided for opening and closing the movable jaw 39. As illustrated, a pin 44 is connected to the member 410 in this instance being directly connected therewith. The finger lever 45 having a finger piece 46 is provided with an arc-shaped slot 47 having a projection 48 which engages the pin 44. Corresponding parts carried by the arm 37 are indicated by the same reference numerals. The bracket 35 also carries a stop which in the form illustrated consists of wings 50, 51 which are preferably integrally secured to the bracket and project therefrom, and are adapted to engage the corner of the film frame. The stop as indicated is arranged at the apex of the angle formed by an extension of the gripping surfaces of the jaws. This angle in the form of the bracket illustrated in Fig. 9 is a right angle.

Having thus described my invention, its operation will be clear. The carriages 12, 13 having been caused to assume their correct position with relation to the stone 52, a film frame of the desired size and carrying a pattern or tint is inserted in the throat between the clamping jaws on the bracket and clamped in place. The bracket is then inserted between the pintles 16, one of these being spring-pressed, as usual which permits the insertion. If it is desired to change to a different size of film, all that is necessary is to move the lever provided with a finger piece so as to unclamp the movable jaw and insert another sized film frame in place of the former one.

It will be observed that my invention readily adapts itself to the form of apparatus for utilizing printing films now in use and does not complicate the construction of the apparatus, nor add to the number of adjusting devices now in use, nor to their likelihood of being jarred out of position. Moreover the wedge that I use, affords a quick and ready means for clamping and unclamping a series of frames to the bracket.

Having thus described my invention, it will be obvious that many changes may be made by the manufacturer or artisan employed to carry the invention into effect without departing from the principle of the invention.

What I claim and desire to secure by Letters Patent is:—

1. An apparatus for utilizing printing films, comprising a base, a pair of independent carriages carried by said base, a bracket pivotally connected to each of said carriages and means carried by said bracket for securing film frames of different sizes thereto.

2. An apparatus for utilizing printing films comprising a base, a pair of independent carriages carried by the base, a pivotal connector on each carriage, a bracket pivotally connected to each of said connectors and means carried by said bracket for securing film frames of different sizes thereto.

3. An apparatus for utilizing printing films, comprising a base, a pair of independent carriages carried by the base, a pivotal connector on each carriage, a bracket pivotally connected to each of said connectors, a fixed jaw and a movable jaw carried by the bracket, said jaws having an open throat and adapted to receive and clamp film frames of different sizes between them.

4. An apparatus for utilizing printing films, comprising a base, a pair of carriages carried by said base, means for adjusting said carriages toward and from each other, a bracket pivotally connected to each of said carriages and means carried by said bracket for securing film frames of different sizes thereto.

5. An apparatus for utilizing printing films, comprising a base, a pair of carriages carried by the base, means for adjusting said carriages toward and from each other, a pivotal connector on each carriage, a bracket pivotally connected to each of said connectors and means carried by said bracket for securing film frames of different sizes thereto.

6. An apparatus for utilizing printing films, comprising a base, a pair of carriages carried by the base, means for adjusting said carriages toward and from each other, a pivotal connector on each carriage, a bracket pivotally connected to each of said connectors, a fixed jaw and a movable jaw carried by the bracket, said jaws having an open throat and adapted to receive and clamp film frames of different sizes between them.

7. An apparatus for utilizing printing films, comprising the combination of a base, a cross-rod carried thereby, a pair of independent carriages carried by said cross-rod, a bracket pivotally connected to each of said carriages and means carried by said bracket for securing film frames of different sizes thereto.

8. An apparatus for utilizing printing films, comprising the combination of a base, a cross-rod carried thereby, independent carriages carried by said cross-rod, a pivotal connector on each carriage, a bracket pivotally connected to each of said connectors and means carried by said bracket for securing film frames of different sizes thereto.

9. An apparatus for utilizing printing films, comprising the combination of a base, means for securing a cross-rod thereto, carriages carried by said cross-rod and adjustably secured thereto so as to be adjustable lengthwise thereof, a pivotal connector on each carriage, a bracket pivotally connected to each of said connectors and means carried by said bracket for securing film frames of different sizes thereto.

10. An apparatus for utilizing printing films, comprising the combination of a base, a pair of standards secured to and rising from the base, a cross-rod, means for securing said cross-rod to said standards, carriages carried by said cross-rod, a pivotal connector on each carriage, a bracket pivotally connected to each of said connectors and provided with one or more pairs of clamping jaws, the parts being so constructed and arranged that the bracket is adapted to carry film frames of different sizes without re-adjusting said carriages.

11. An apparatus for utilizing printing films, comprising the combination of a base, a cross-rod carried thereby, independent carriages carried by said cross-rod, a bracket pivotally connected to each of said carriages, a fixed jaw carried by said bracket and a movable jaw carried by said bracket, said jaws being provided with an open throat to receive and clamp a film frame between them.

12. An apparatus for utilizing printing films, comprising the combination of a base, a pair of standards secured to and rising from the base, a cross-rod, means for securing said cross-rod to said standards, carriages carried by said cross-rod, means for adjusting said carriages toward and from each other, a pivotal connector on each carriage, a bracket pivotally connected to each of said connectors and provided with one or more pairs of clamping jaws, said jaws having an open throat for the insertion of the film frame, the parts being so constructed and arranged that the bracket is adapted to carry film frames of different sizes without re-adjusting said carriages.

13. An apparatus for utilizing printing films, comprising the combination of a base, a cross-rod carried thereby, carriages carried by said cross-rod, means for adjusting said carriages toward and from each other, a bracket pivotally connected to each of said carriages, a fixed jaw carried by said bracket and a movable jaw carried by said bracket, said jaws being provided with an open throat to receive and clamp a film frame between them.

14. An apparatus for utilizing printing films, comprising the combination of a base, a cross-rod carried thereby, independent carriages carried by said cross-rod, a bracket pivotally connected to each of said carriages, a plurality of pairs of jaws carried by said bracket, each of said pairs of jaws having an open throat and each pair adapted to receive and clamp a film frame between them.

15. An apparatus for utilizing printing films, comprising the combination of a base, a cross-rod carried thereby, carriages carried by said cross-rod, a bracket pivotally connected to each of said carriages, a fixed jaw carried by the bracket, a movable jaw carried by the bracket, said fixed and movable jaws having an open throat between them, an inclined way on said bracket, said movable jaw being provided with a member coöperating with said inclined way, and means for moving said member, thereby causing said jaw to exert a clamping action.

16. An apparatus for utilizing printing films, comprising the combination of a base, a cross-rod carried thereby, carriages carried by said cross-rod, a bracket pivotally connected to each of said carriages, a fixed jaw carried by the bracket, a movable jaw carried by the bracket, said fixed and movable jaws having an open throat between them, an inclined way on said bracket, said movable jaw being provided with a member coöperating with said inclined way, a lever and connections between said lever and said member, whereby said jaw is adapted to exert a clamping action.

17. An apparatus for utilizing printing films, comprising the combination of a base, a cross-rod carried thereby, carriages carried by said cross-rod, a bracket pivotally connected to each of said carriages, a fixed jaw carried by said bracket and a movable jaw carried by said bracket, said jaws being provided with an open throat to receive and clamp a film frame between them, an inclined way, a member coöperating therewith, a pin connected with said member, and a lever carrying a track with which the pin engages.

18. An apparatus for utilizing printing films, comprising the combination of a base, a cross-rod carried thereby, carriages carried by said cross-rod, a bracket pivotally connected to each of said carriages, a fixed jaw carried by said bracket and a movable jaw carried by said bracket, said jaws being provided with an open throat to receive and clamp a film frame between them, an inclined way, a member coöperating therewith, a pin connected with said member, and a lever carrying a track with which the pin engages, said lever being pivoted to said bracket and being provided with a finger piece.

19. An apparatus for utilizing printing films, comprising the combination of a base, a cross-rod carried thereby, carriages carried by said cross-rod, a bracket pivotally connected to each of said carriages, a fixed jaw carried by said bracket and a movable jaw carried by said bracket, said jaws being provided with an open throat to receive and clamp a film frame betwen them, an inclined way, a member coöperating therewith, a pin connected with said member, and a lever carlying an arc-shaped track, with which the pin engages at all times, said lever being pivoted to said bracket and carrying a finger piece.

20. An apparatus for utilizing printing films, comprising the combination of a base, a cross-rod carried thereby, independent carriages carried by said cross-rod, a bracket pivotally connected to each of said carriages, said bracket being provided with a strengthening rib and means carried by said bracket for adjustably securing film frames of different sizes thereto.

21. An apparatus for utilizing printing films, comprising the combination of a base, a bracket pivotally mounted on said base, a fixed clamping jaw carried by said bracket and integral therewith, a movable jaw carried by said bracket and adapted to coöperate with said fixed jaw to clamp a film frame between them, an inclined way inclined at an acute angle to the gripping faces of said jaws, a member secured to said movable jaw and sliding in said way, a pin connected with said member, a pivoted lever carrying a finger piece pivoted to said bracket and connections between said finger piece and said pin including an arc-shaped track provided with a projection adapted to engage said pin whereby said movable jaw may be opened and closed.

22. A bracket for holding film frames of different sizes and adapted for insertion in an apparatus for utilizing printing films, comprising a plate, means carried by the plate for pivotally securing said bracket to said apparatus, a fixed jaw and a movable jaw carried by said bracket adapted to carry film frames of different sizes between them, a way carried by said bracket, inclined at an acute angle to the gripping faces of the said jaws, a member connected to said movable jaw and coöperating with said inclined way, a lever on top of said bracket, said lever being provided with a finger piece and connections between said lever and said member whereby said movable jaw is adapted to exert a clamping action.

23. A bracket for holding film frames of different sizes and adapted for insertion in an apparatus for utilizing printing films, comprising a plate, means carried by the plate for pivotally securing said bracket to said apparatus, a plurality of pairs of jaws carried by said bracket and adapted to carry film frames of different sizes between them, one jaw of each pair being fixed and the other jaw movable, a plurality of wedges carried by said bracket, a member connected to each movable jaw and coöperating with one of said wedges, a connecting rod connecting said members, a lever carried by said bracket and connected with said rod whereby said movable jaws may be caused to exert a clamping action.

24. A bracket for holding film frames of different sizes and adapted for insertion in an apparatus for utilizing printing films, comprising a plate, means carried by the plate for pivotally securing said bracket to said apparatus, a plurality of pairs of jaws carried by said bracket and adapted to carry film frames of different sizes between them, one jaw of each pair being fixed and the other jaw movable, a plurality of wedges carried by said bracket, a member connected to each movable jaw and coöperating with one of said wedges, a connecting rod connecting said members, a pin carried by said rod, a lever carried by said bracket and engaging said pin whereby said movable jaws may be caused to exert a clamping action.

25. A bracket for holding film frames of different sizes and adapted for insertion in an apparatus for utilizing printing films, comprising a plate, means carried by the plate for pivotally securing said bracket to said apparatus, a plurality of pairs of jaws carried by said bracket and adapted to carry film frames of different sizes between them, one jaw of each pair being fixed and the other jaw movable, a plurality of wedges carried by said bracket, a member connected to each movable jaw and coöperating with one of said wedges, a connecting rod connecting said members, a pin carried by said connecting rod, a lever carried by said bracket, said lever being provided with an arc-shaped track with which said pin engages, whereby said movable jaws are adapted to exert a clamping action.

26. A bracket for holding film frames of different sizes and adapted for insertion in an apparatus for utilizing printing films, comprising a plate, means carried by the plate for pivotally securing said bracket to said apparatus, a plurality of pairs of jaws carried by said bracket and adapted to carry film frames of different sizes between them, one jaw of each pair being fixed and the other jaw movable, a plurality of wedges carried by said bracket, a member connected to each movable jaw and coöperating with one of said wedges, a connecting rod connecting said members, a pin carried by said connecting rod, a lever provided with one or more finger pieces carried by said bracket, said lever being provided with an arc-shaped track having a projection with which said pin engages whereby said movable jaws are adapted to exert a clamping action.

27. A bracket for holding film frames of different sizes and adapted for insertion in an apparatus for utilizing printing films, comprising a plate, means carried by the plate for pivotally securing said bracket to said apparatus, a plurality of pairs of jaws carried by said bracket and adapted to carry film frames of different sizes between them, one jaw of each pair being movable, a plurality of wedges carried by said bracket, a member connected to each movable jaw and coöperating with one of said wedges, a connecting rod connecting said members, a lever provided with one or more finger pieces carried by said bracket, said lever being connected to said rod so as to actuate said jaws simultaneously.

28. An apparatus for utilizing printing films comprising a base, a pair of carriages carried by said base, one of said carriages being adjustable with relation to the other, a bracket pivotally connected to each of said carriages and means carried by said bracket for securing film frames of different sizes thereto.

29. An apparatus for utilizing printing films comprising a base, a pair of carriages carried by said base, means whereby one of said carriages may be adjusted toward and from the work independently of the other carriage, a bracket pivotally connected to each of said carriages and means carried by said bracket for securing film frames of different sizes thereto.

30. An apparatus for utilizing printing films comprising a base, a pair of carriages carried by said base, a cross-rod on which the carriages are mounted, said carriages being removably secured to said cross-rod, a bracket pivotally connected to each of said carriages and means carried by said bracket for securing film frames of different sizes thereto.

31. An apparatus for utilizing printing films comprising a base, a cross-rod, a pair of carriages, one of which is revolubly and removably secured to said cross-rod, a bracket pivotally connected to each of said carriages and means carried by said bracket for securing film frames of different sizes thereto.

32. An apparatus for utilizing printing films, comprising a portable base, a pair of standards integral with said base, a cross-rod, means for securing said cross-rod to said standards, a pair of independent carriages carried by said cross-rod, one of said carriages being revolubly adjustable on said rod, a bracket pivotally connected to each of said carriages and means carried by said bracket for securing film frames of different sizes thereto.

33. An apparatus for utilizing printing films, comprising a portable base, a pair of standards integral with and rising from said base, a cross-rod, means for securing said cross-rod to said standards, a pair of independent carriages removably and revolubly secured to said cross-rod, a bracket pivotally connected to each of said carriages and means carried by said bracket for securing film frames of different sizes thereto.

In testimony whereof, I have signed my name to this specification, in the presence of two subscribing witnesses.

BENJAMIN DAY.

Witnesses:
W. F. BISSING,
SARAH FLOCK.